No. 723,919. PATENTED MAR. 31, 1903.
C. J. & C. C. QUINN.
CALF WEANER.
APPLICATION FILED MAR. 13, 1902.
NO MODEL.

Witnesses
Howard N. Orr
H. F. Shepard

Charles J. Quinn
Charles C. Quinn,
Inventors,

By E. G. Siggers.
Attorney

UNITED STATES PATENT OFFICE.

CHARLES J. QUINN AND CHARLES C. QUINN, OF SCRANTON, IOWA.

CALF-WEANER.

SPECIFICATION forming part of Letters Patent No. 723,919, dated March 31, 1903.

Application filed March 13, 1902. Serial No. 98,049. (No model.)

*To all whom it may concern:*

Be it known that we, CHARLES J. QUINN and CHARLES C. QUINN, citizens of the United States, residing at Scranton, in the county of Greene and State of Iowa, have invented a new and useful Calf-Weaner, of which the following is a specification.

This invention relates to calf-weaners, and has for its object to provide an improved device of this character which is arranged to drop down and cover the mouth of an animal when it lifts its head in position to suck and is also arranged to yield upwardly when engaged with the ground, so as to permit grazing of the animal.

Another object is to provide for mounting the device upon an animal in such a manner as to take the weight of the device off from the nostrils thereof and to support the same upon the top of the head and the bridge of the nose.

Another object is to have the device conveniently adjustable, so that it may be fitted to animals of different sizes, and also to have the supporting parts so arranged as to comfortably fit the animal, and thereby avoid annoyance thereto.

Final objects reside in the detail construction of the muzzle or basket for embracing the mouth of the animal and in the manner of providing the prods or prongs, so as to form the braces for the muzzle or basket.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
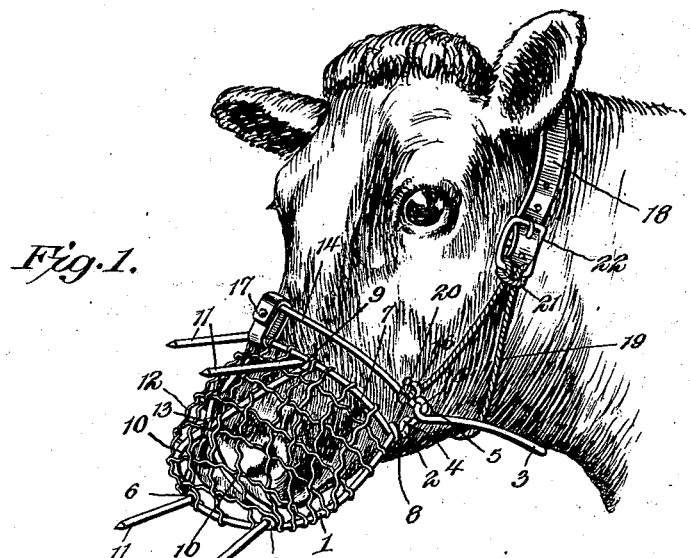
Figure 2:
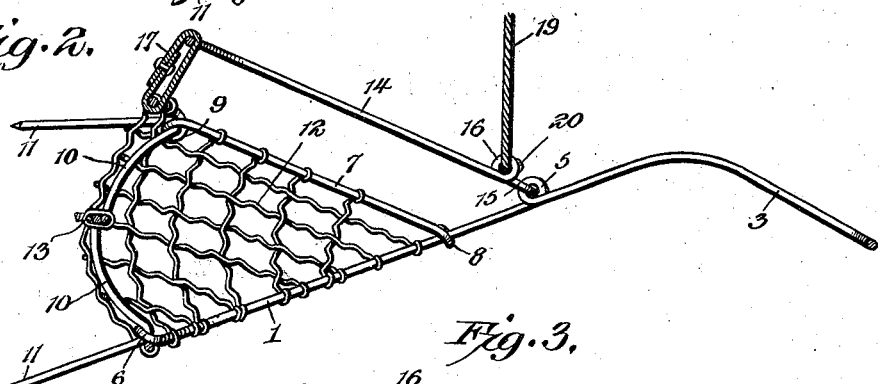
Figure 3:
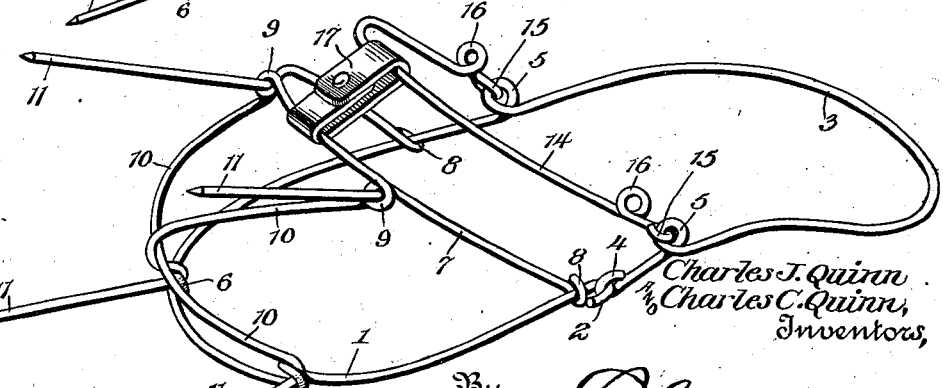

In the drawings, Figure 1 is a perspective view of the improved weaner applied to the head of a calf. Fig. 2 is a longitudinal sectional view of the device. Fig. 3 is a detail perspective view of the main frame with the wire basket or muzzle omitted.

Like characters of reference designate corresponding parts in all the figures of the drawings.

In carrying out the present invention there is provided a stiff muzzle or basket, preferably formed of wire, which is braced and stiffened so as to prevent breakage thereof, and also a flexible harness for engagement with the head of an animal, so as to support the stiff muzzle in proper position with respect to the mouth of the animal and to accommodate the device to the movements of the animal's head.

The muzzle portion of the device consists of a lower substantially U-shaped frame bar or member 1, which is formed of heavy stiff wire, one end of which is bent into a loop or eye 2 and its opposite end portion extended rearwardly and bowed downwardly to form a throat-bar 3, the terminal of said bar being extended forwardly and looped into the loop 2, as indicated at 4, so as to form a rigid connection therewith. Just in rear of the connected ends of the lower frame member and at opposite sides of the frame are provided the upstanding eyes 5, each of which is formed by bending the wire. Other upstanding loops or eyes 6 are formed at the forward end of the frame member 1 by twisting the wire. An upper arched member 7, formed of stiff wire, is located in front of the eyes 5 and has its opposite ends looped around the lower member, as at 8, these loops being soldered or otherwise secured to the lower frame-bar, so as to form a rigid connection therewith. Eyes 9 are twisted in the intermediate portion of the arched member 7 and are disposed so as to correspond with the respective eyes 6. Crossed braces 10, formed of stiff wire, have their opposite ends passed through the opposite eyes 6 and 9, the ends of said braces being extended forwardly to a suitable distance beyond the frame and pointed, so as to form prongs or prods 11. These braces are of course bent to form the prongs 11, and the bends thereof lie in the respective eyes 6 and 9, to which the braces are soldered or otherwise connected, whereby the upper and lower frame members are braced in a very substantial manner. As best indicated in Fig. 2, it will be observed that the brace-bars 10 are bowed forwardly, so as to form a rounded frame structure. A reticulated wire cover 12 of suitable stiffness is stretched over this frame and connected to the upper and lower bars in any suitable manner, thereby completing the rigid part of the device and forming a rounded basket or muzzle. The central portion of this basket or muzzle is secured to the bowed braces at their point of intersection by means of a wire 13, which is looped over one of the strands of the basket and the crossed braces, the latter also being soldered at their point of intersection.

A nose-engaging member 14, consisting of an inverted substantially U-shaped bail formed of stiff wire, has its opposite ends provided with loops or eyes 15, which engage the eyes 5 of the lower frame member, so as to form a pivotal or swinging connection therewith, and adjacent to these terminal eyes the opposite sides of the bail are twisted into a pair of transversely-alined and upstanding eyes 16. The swinging movement of this bail is limited by means of a loop or link 17, preferably of leather, which embraces the central portion of the bail and a corresponding portion of the frame member 7.

For the support of the rigid portion of the device there is provided a head-strap 18, preferably formed of leather, which has its opposite ends connected to the bail 14, preferably by means of a rope. The intermediate portion of this rope forms a throat-loop 19, and the opposite end portions thereof, which form cheek-straps, are passed through the respective eyes 16 and then tied into knots 20, which form heads or stops which are larger than the eyes, and thereby prevent the rope from being pulled through the eyes. At a point substantially midway between each end of the rope and the throat-loop portion thereof there is provided a slip-knot 21, which embraces one end bar of a buckle 22, the latter being in turn adjustably connected to the adjacent end of the head-strap by having the latter passed through the buckle and engaged with the tongue thereof in the usual manner. By this arrangement it will be seen that the buckle is adjustable upon the strap, and the length of the connections between the head-strap and the muzzle, as well as the length of the troat-loop, may be adjusted by loosening the knot 21 and slipping the rope through the buckle, whereby the harness may be conveniently adjusted to properly fit the heads of animals of different sizes.

In applying the device one end of the head-strap is detached from the adjacent buckle, and the device is applied to the head of the animal from the under side thereof, so as to receive the nose within the basket or muzzle, with the throat-bar and throat-loop beneath the throat and the nose-bar engaging over the bridge of the nose, after which the head-strap is thrown over the top of the head just back of the ears and then engaged with the buckle. When thus fitted in position, the basket or muzzle embraces the mouth of the animal, the opposite cheek-bars formed by the rear extensions of the lower member of the the muzzle-frame lie at opposite sides of the head of the animal, so as to prevent lateral displacement of the device, and the latter is supported from the top of the head by means of the head-strap. It will be observed that the nose-bar 14 rests across the bridge of the nose of the animal, so as to support the major portion of the weight of the muzzle, and thereby remove the same from the nostrils of the animal when the head of the latter is in its normal position and also when it is elevated. When the animal lowers its head to graze, the lower edge of the muzzle or basket strikes the ground and is vertically yieldable upon the pivotal support formed between the nose-bar and the lower frame, whereby the animal may graze without interference by the device.

What we claim is—

1. In a calf-weaner, the combination with a muzzle having opposite side bars extended rearwardly and connected to form a throat-bar rigid with the muzzle to bear against the neck of an animal and support the weight of the device when the animal lifts its head, a nose-bar loosely connected to the muzzle, and a head-strap connected to the nose-bar.

2. In a calf-weaner, the combination with a muzzle, of a throat-bar rigidly carried thereby, a nose-bar independent of the throat-bar with its opposite ends loosely connected to the muzzle, a head-strap loosely connected to the nose-bar at a point above the connection between the latter and the muzzle, and a flexible throat-loop hung from the head-strap at a point above the connection between the latter and the nose-bar and in rear of the muzzle.

3. In a calf-weaner, the combination with a muzzle having opposite side bars extended rearwardly and connected to form a throat-bar rigid with the muzzle, eyes provided upon opposite sides of the throat-bar, an arched nose-bar having its opposite ends pivotally connected to the respective eyes, a head-strap connected to the nose-bar at a point above the connection between the latter and the eyes, and a throat-loop hung from the head-strap at a point above the connection between the latter and the nose-bar and also disposed in rear of the muzzle.

4. In a calf-weaner, the combination with a muzzle, of a throat-bar rigidly carried thereby, a nose-bar independent of the throat-bar with its opposite ends loosely connected to the muzzle, a link disposed substantially midway between the opposite ends of the nose-bar and loosely connecting the latter to the muzzle, and a head-strap connected to the nose-bar at a point above the connection of the latter with the muzzle.

5. In a calf-weaner, the combination with a muzzle, of a throat-bar rigidly carried thereby, a nose-bar independent of the throat-bar with its opposite ends loosely connected to the muzzle, a loop-shaped link loosely embracing an intermediate portion of the nose-bar and an adjacent portion of the muzzle to limit the swinging movement of the nose-bar, and a head-strap connected to the nose-bar at a point above the connection between the latter and the muzzle.

6. In a calf-weaner, the combination with a muzzle having opposite side bars extended rearwardly and connected to form a rigid throat-bar, the opposite side portions of the latter being twisted into transversely-alined eyes, an arched nose-bar having its opposite ends formed into terminal eyes loosely engaging the eyes of the throat-bar, and also having other eyes formed adjacent to the terminal eyes, a head-strap connected to the said other eyes of the nose-bar, and a throat-loop connected to the head-strap.

7. In a calf-weaner, the combination with a muzzle having a loosely-mounted nose-bar, of a head-strap, and a flexible member having its opposite ends connected to the nose-bar, and opposite intermediate portions connected to the respective ends of the head-strap, the opposite end portions of said member extending between the nose-bar and the head-strap forming cheek-straps, and the remaining intermediate portion of the flexible member which extends between the ends of the head-strap forming a throat-loop.

8. In a calf-weaner, the combination with a muzzle having a loosely-mounted nose-bar, and a head-strap, of a flexible member formed into a loop with its opposite ends connected to the nose-bar, and opposite fastenings secured to and carried by corresponding intermediate portions of the looped flexible member and capable of adjustable engagement with the respective ends of the head-strap, the end portions of the flexible member between the fastenings and the nose-bar forming cheek-straps, and the remaining intermediate portion of the flexible member which extends between the fastenings forming a throat-loop.

9. In a calf-weaner, the combination with a muzzle having an arched nose-bar pivotally connected at opposite ends to the muzzle, and a head-strap, of a flexible member formed into a loop with its opposite ends connected to the nose-bar, and opposite buckles connected to corresponding intermediate portions of the looped flexible member by means of slip-knots formed therein, whereby the buckles may be adjusted upon the flexible member, and said buckles also forming adjustable connections between the flexible member and the ends of the head-strap, the end portions of the flexible member between the buckles and the nose-bar forming cheek-straps, and the remaining intermediate portion of the flexible member extending between the buckles forming a throat-loop.

10. A calf-weaner, comprising a muzzle having a lower bowed frame-bar, an arched frame-bar rising above the lower frame-bar and having its opposite ends connected thereto, said bars having corresponding eyes twisted therein, bowed crossed braces having their opposite ends bent back thereon and passed forwardly through corresponding eyes to form prongs or prods, and a reticulated basket applied to the upper and lower frame-bars across the outer sides of the braces, whereby the latter also brace the basket.

11. In a calf-weaner, the combination of a muzzle comprising a lower substantially U-shaped frame member having its opposite ends extended rearwardly and connected to form opposite cheek-bars and a rigid throat-bar, the intermediate portions of the cheek-bars being twisted into eyes, an arched frame-bar rising above the lower frame and having its opposite ends connected thereto, a reticulated basket secured to the frame-bars, an arched nose-bar rising above the frame with its opposite ends loosely connected to the eyes of the cheek-bars and also having opposite eyes twisted therein, and a stop loop or ring loosely embracing corresponding intermediate portions of the nose-bar and the arched frame-bar.

12. A calf-weaner comprising a muzzle having a lower bowed frame-bar provided at intermediate points with eyes, an upper arched frame member rising above the lower frame member, secured rigidly thereto and having corresponding eyes, bowed crossed braces arranged in the space between said bars and having their ends passed through said eyes and projecting therefrom to form prongs or prods, and a reticulated basket connected to the said bars and arranged on the outside of the crossed braces, whereby the latter also form braces for the basket.

13. In a calf-weaner, the combination of a muzzle, comprising a lower substantially U-shaped frame member having its opposite ends extended rearwardly and connected to form opposite rigid cheek-bars and a rigid throat-bar, corresponding intermediate portions of the cheek-bars being twisted into eyes, an arched frame-bar rising above the lower frame member with its opposite ends connected thereto in front of the eyes, the front portion of the lower frame member and the arched member having corresponding eyes twisted therein, bowed cross-braces arranged in the space between the frame members with their ends passed through the corresponding eyes and projected forwardly therefrom to form prongs or prods, a reticulated basket connected to the frame members and disposed upon the outside of the cross-braces, whereby the latter also form braces for the basket, an arched nose-bar pivoted to the eyes of the cheek-bars, a looped link loosely embracing the nose-bar and the arched frame-bar, a head-strap having its opposite ends connected to the nose-bar above its pivotal connections with the cheek-bars, and a throat-loop hung upon the head-strap in rear of the muzzle.

In testimony that we claim the foregoing as our own we have hereto affixed our signatures in the presence of two witnesses.

CHARLES J. QUINN.
CHARLES C. QUINN.

Witnesses:
BARTON L. WRIGHT,
W. E. GLENN.